United States Patent
Tsunashima et al.

(10) Patent No.: US 8,247,112 B2
(45) Date of Patent: Aug. 21, 2012

(54) ELECTROLYTE, ELECTROLYTE SOLUTION FOR LITHIUM-ION SECONDARY BATTERY COMPRISING THE ELECTROLYTE, AND LITHIUM-ION SECONDARY BATTERY USING THE ELECTROLYTE SOLUTION

(75) Inventors: Katsuhiko Tsunashima, Tokyo (JP); Masahiro Kikuchi, Tokyo (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 637 days.

(21) Appl. No.: 12/440,975

(22) PCT Filed: Sep. 11, 2007

(86) PCT No.: PCT/JP2007/067620
§ 371 (c)(1),
(2), (4) Date: Mar. 12, 2009

(87) PCT Pub. No.: WO2008/032688
PCT Pub. Date: Mar. 20, 2008

(65) Prior Publication Data
US 2010/0003597 A1    Jan. 7, 2010

(30) Foreign Application Priority Data
Sep. 12, 2006  (JP) .................................. 2006-246422

(51) Int. Cl.
*H01M 6/04* (2006.01)
(52) U.S. Cl. ........ 429/200; 429/199; 429/188; 429/323; 429/322; 252/62.2
(58) Field of Classification Search .................. 429/200, 429/199, 188, 323, 322; 252/62.2
See application file for complete search history.

(56) References Cited

FOREIGN PATENT DOCUMENTS

| | | | |
|---|---|---|---|
| BR | 2003003079 | * | 4/2005 |
| EP | 0749173 A1 | | 12/1996 |
| JP | 63-121268 A | | 5/1988 |
| JP | 9-63643 A | | 3/1997 |
| JP | 9-171943 A | | 6/1997 |
| JP | 2000-277125 A | | 10/2000 |
| JP | 2001-35253 | * | 2/2001 |
| JP | 2004-43407 A | | 2/2004 |
| JP | 2004-087145 A | | 3/2004 |
| JP | 2005-314646 A | | 11/2005 |
| JP | 2006-210022 A | | 8/2006 |
| WO | 2005/042466 A1 | | 5/2005 |

OTHER PUBLICATIONS

Tsunashima et al. "Physical and electrochemical properties of low-viscosity phosphonium ionic liquids as potential electrolytes", Electrochemistry Communications (2007), 9 (9), pp. 2353-2358. Available online Jul. 12, 2007.*
International Search Report of PCT/JP2007/067620, Mailing Date of Dec. 18, 2007.

* cited by examiner

*Primary Examiner* — Laura Weiner
(74) *Attorney, Agent, or Firm* — Westerman, Hattori, Daniels & Adrian, LLP

(57) ABSTRACT

An object of the present invention is to provide an electrolyte solution for lithium-ion secondary batteries comprising a tetraalkylphosphonium salt which improves the cycle characteristics and safety of lithium-ion batteries, and to provide a lithium-ion secondary battery using the electrolyte solution. Disclosed is an electrolyte comprising a tetraalkylphosphonium salt represented by general formula (1)

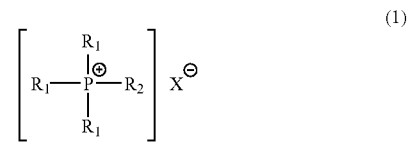

(1)

wherein $R_1$ represents a linear, branched or alicyclic alkyl group having 2 to 6 carbon atoms and $R_2$ represents a linear, branched or alicyclic alkyl group having 1 to 14 carbon atoms, provided that $R_1$ and $R_2$ are different from each other and the total number of carbon atoms in the phosphonium cation is 20 or less; and X represents an anion.

11 Claims, 4 Drawing Sheets

ELECTROLYTE, ELECTROLYTE SOLUTION FOR LITHIUM-ION SECONDARY BATTERY COMPRISING THE ELECTROLYTE, AND LITHIUM-ION SECONDARY BATTERY USING THE ELECTROLYTE SOLUTION

TECHNICAL FIELD

The present invention relates to an electrolyte comprising a tetraalkylphosphonium salt, an electrolyte solution for lithium-ion secondary batteries comprising the tetraalkylphosphonium salt, and a lithium-ion secondary battery using the electrolyte solution.

BACKGROUND ART

Ethylene carbonate, dimethyl carbonate, diethyl carbonate, ethyl methyl carbonate, and the like have been used as a solvent for an electrolyte solution of a lithium-ion secondary battery which is one of nonaqueous electrolyte secondary batteries. Since these organic solvents have excellent performance such as solubility of lithium compounds and high electrical conductivity, they are widely used as solvents for electrolyte solutions.

In recent years, in order to further improve efficiency of nonaqueous electrolyte secondary batteries, the performance improvement by adding a phosphonium salt to a nonaqueous electrolyte solution has been attempted (for example, refer to Patent Documents 1 to 4).

For example, Patent Document 1 proposes improving the low-temperature characteristics of electrochemical devices with a phosphonium salt compound using an anionic compound having an asymmetric structure as the anion portion of the phosphonium salt. However, when such a compound is used as an electrolyte solution of a lithium-ion secondary battery, there is also a problem of reduction in discharge capacity and cycle characteristics, and sufficient battery capacity is not obtained.

Patent Documents 2 to 4 propose using an electrolyte solution obtained by adding a phosphonium salt to an organic electrolyte solution for a lithium secondary battery. However, although these electrolyte solutions provide improved cycle characteristics, they had a problem of reduction in the initial discharge capacity.

Patent Document 1: Japanese Patent Laid-Open No. 2004-43407
Patent Document 2: Japanese Patent Laid-Open No. 9-63643
Patent Document 3: Japanese Patent Laid-Open No. 2004-87145
Patent Document 4: Japanese Patent Laid-Open No. 63-121268

DISCLOSURE OF THE INVENTION

Problems to be Solved by the Invention

Therefore, the object of the present invention is particularly to provide an electrolyte comprising a tetraalkylphosphonium salt which can improve the cycle characteristics and safety of lithium-ion secondary batteries, and to provide an electrolyte solution for lithium-ion secondary batteries comprising the electrolyte and a lithium-ion secondary battery using the electrolyte solution.

Means for Solving the Problems

As a result of extensive and intensive studies under the circumstances, the present inventors have found that an electrolyte solution comprising an electrolyte comprising a specific tetraalkylphosphonium salt has high flame retardancy; a lithium-ion secondary battery using the electrolyte solution has large discharge capacity, high energy density, excellent cycle characteristics, and excellent characteristics in a wide temperature range; and the electrolyte solution can also improve the safety of a lithium-ion secondary battery by suppressing the thermal decomposition of a positive electrode active material in a charged state. The present invention has been completed on the basis of these findings.

Specifically, the present invention provides an electrolyte characterized by comprising a tetraalkylphosphonium salt represented by general formula (1):

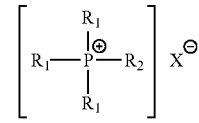

(1)

wherein $R_1$ represents a linear, branched or alicyclic alkyl group having 2 to 6 carbon atoms and $R_2$ represents a linear, branched or alicyclic alkyl group having 1 to 14 carbon atoms, provided that $R_1$ and $R_2$ are different from each other and the total number of carbon atoms in the phosphonium cation is 20 or less; and X represents an anion.

The present invention further provides an electrolyte, characterized in that, in the general formula (1), $R_1$ has a larger number of carbon atoms than $R_2$.

The present invention further provides an electrolyte, characterized in that, in the general formula (1), $R_2$ has a larger number of carbon atoms than $R_1$.

The present invention further provides an electrolyte, characterized in that, in the general formula (1), $R_2$ is a methyl group.

The present invention further provides an electrolyte, characterized in that, in the general formula (1), $R_2$ is an ethyl group.

The present invention further provides an electrolyte, characterized in that, in the general formula (1), X is an anion selected from the group consisting of $PF_6$, $BF_4$, $SO_3CF_3$, $B(C_2O_4)_2$, and $N(SO_2CF_3)_2$.

The present invention further provides an electrolyte, characterized in that the tetraalkylphosphonium salt represented by the general formula (1) has a melting point of 100° C. or less.

The present invention further provides an electrolyte, characterized in that the tetraalkylphosphonium salt represented by the general formula (1) has a moisture content of 300 ppm or less.

The present invention further provides an electrolyte, characterized in that the tetraalkylphosphonium salt represented by the general formula (1) has a chlorine content of 100 ppm or less.

The present invention further provides an electrolyte, characterized in that the tetraalkylphosphonium salt represented by the general formula (1) is tri-n-butylmethylphosphonium bis(trifluoromethylsulfonyl)imide.

The present invention further provides an electrolyte, characterized in that the tetraalkylphosphonium salt represented by the general formula (1) is triethylmethylphosphonium bis(trifluoromethylsulfonyl)imide.

The present invention further provides an electrolyte solution for lithium-ion secondary batteries, characterized by comprising any of the electrolytes described above.

The present invention further provides an electrolyte solution for lithium-ion secondary batteries, characterized by further comprising a lithium compound.

The present invention further provides an electrolyte solution for lithium-ion secondary batteries, characterized by further comprising a nonaqueous solvent.

The present invention further provides an electrolyte solution for lithium-ion secondary batteries, characterized by comprising the tetraalkylphosphonium salt represented by the general formula (1) in an amount of 2% by volume or more and 70% by volume or less.

The present invention further provides an electrolyte solution for lithium-ion secondary batteries, characterized in that the lithium compound is one or more selected from the group consisting of $LiPF_6$, $LiBF_4$, $LiSO_3CF_3$, $LiB(C_2O_4)_2$, and $LiN(SO_2CF_3)_2$.

The present invention further provides an electrolyte solution for lithium-ion secondary batteries, characterized in that the lithium compound is two or more selected from the group consisting of $LiPF_6$, $LiBF_4$, $LiSO_3CF_3$, $LiB(C_2O_4)_2$, and $LiN(SO_2CF_3)_2$.

The present invention further provides a lithium-ion secondary battery, characterized by using any of the electrolyte solutions for lithium-ion secondary batteries described above.

BEST MODE FOR CARRYING OUT THE INVENTION

<Electrolyte>

Hereinafter, the present invention will be described based on the preferred embodiments thereof. The electrolyte according to the present invention is characterized by comprising a tetraalkylphosphonium salt represented by general formula (1):

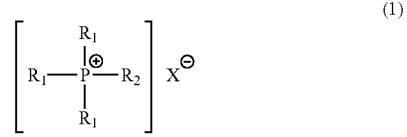

(1)

wherein $R_1$ represents a linear, branched or alicyclic alkyl group having 2 to 6 carbon atoms and $R_2$ represents a linear, branched or alicyclic alkyl group having 1 to 14 carbon atoms, provided that $R_1$ and $R_2$ are different from each other and the total number of carbon atoms in the phosphonium cation is 20 or less; and X represents an anion.

The electrolyte comprising the tetraalkylphosphonium salt having the above described structure has excellent solubility in a nonaqueous solvent and imparts excellent flame retardancy to an electrolyte solution comprising the tetraalkylphosphonium salt. Particularly, the lithium-ion secondary battery using the electrolyte solution has improved safety and can exhibits good cycle characteristics even in low temperatures.

It should be noted that, if, in the tetraalkylphosphonium salt, the groups $R_1$ and $R_2$ in the general formula (1) are alkyl groups having numbers of carbon atoms outside the above described ranges, the phosphonium salt has low solubility in a nonaqueous solvent, and it is difficult to improve the safety and cycle characteristics particularly in the lithium-ion secondary battery using the electrolyte solution comprising the phosphonium salt as an electrolyte.

Specifically, the alkyl group $R_1$ in the general formula (1) includes an ethyl group, a n-propyl group, a n-butyl group, a n-hexyl group, an i-propyl group, and a cyclohexyl group.

Specifically, the alkyl group $R_2$ includes a methyl group, an ethyl group, a n-propyl group, a n-pentyl group, a n-octyl group, and a n-dodecyl group.

In the present invention, when a tetraalkylphosphonium salt is represented by the general formula (1) in which $R_1$ represents an alkyl group having 2 to 4 carbon atoms and $R_2$ represents an alkyl group having 1 to 12 carbon atoms, the tetraalkylphosphonium salt is preferred in that it has a low melting point, has excellent solubility in a nonaqueous solvent, and imparts excellent flame retardancy to an electrolyte solution comprising the tetraalkylphosphonium salt. Particularly, the lithium-ion secondary battery using the electrolyte solution is preferred in that it has improved safety and can exhibits good cycle characteristics even in low temperatures.

Further, in the general formula (1), the total number of carbon atoms in the tetraalkylphosphonium (represented by 3X+Y, wherein X represents the number of carbon atoms in $R_1$ and Y represents the number of carbon atoms in $R_2$) is 20 or less, preferably 7 or more and 20 or less. Particularly, when the total number of carbon atoms is 7 or more and 18 or less, the resulting tetraalkylphosphonium salt can have a lower melting point and an improved solubility in a nonaqueous solvent. There is also an advantage in production in that removal of impurities with an organic solvent or water is easier.

The tetraalkylphosphonium salt represented by the general formula (1) used in the present invention may have a structure in which the number of carbon atoms in $R_1$ (X) is larger than the number of carbon atoms in $R_2$ (Y) or a structure in which the number of carbon atoms in $R_2$ (Y) is larger than the number of carbon atoms in $R_1$ (X). When the number of carbon atoms in $R_1$ (X) is larger than the number of carbon atoms in $R_2$ (Y), $R_2$ in the formula is preferably a methyl group. On the other hand, when the number of carbon atoms in $R_2$ (Y) is larger than the number of carbon atoms in $R_1$ (X), $R_1$ is preferably an ethyl group in that the effect according to the present invention is particularly high.

The anion component of X in the general formula (1) is not particularly limited as long as it is not decomposed when it is used as an electrolyte. Examples of the anion component include tetrafluoroborate ($BF_4$), hexafluorophosphate ($PF_6$), bis(trifluoromethylsulfonyl)imide ($N(SO_2CF_3)_2$), trifluoromethanesulfonate ($SO_3CF_3$), methanesulfonate ($SO_3CH_3$), tris(pentafluoroethyl)trifluorophosphane (($C_2H_5)_3PF_3$), trifluoroacetic acid ($CF_3COO$), an amino acid, bis(oxalato)borate ($B(C_2O_4)_2$), p-toluenesulfonate ($SO_3C_6H_4CH_3$), thiocyanate (SCN), and dicyanamide ($N(CN)_2$). Among these, it is preferred to use bis(trifluoromethylsulfonyl)imide because it can reduce the melting point of a tetraalkylphosphonium salt electrolyte. Further, it is preferred to use an anion which is a bulky and has a low structural symmetry because it tends to reduce the melting point of a tetraalkylphosphonium salt.

Examples of the specific tetraalkylphosphonium salt represented by the general formula (1) include triethylmethylphosphonium tetrafluoroborate, tri-n-propylmethylphosphonium tetrafluoroborate, triethylmethylphosphonium hexafluoroborate, tri-n-propylmethylphosphonium hexafluorophosphate, triethylmethylphosphonium bis(trifluoromethylsulfonyl)imide, tri-n-propylmethylphosphonium bis(trifluoromethylsulfonyl)imide, tri-n-butylmethylphosphonium tetrafluoroborate, tri-n-butylmethylphosphonium hexafluorophosphate, tri-n-butylmethylphosphonium bis(trifluoromethylsulfonyl)imide, tri-n-pentylmethylphosphonium tetrafluoroborate, tri-n-pentylmethylphosphonium hexafluorophosphate, tri-n-pentylmethylphosphonium bis(trifluoromethylsulfonyl)imide, tri-n-hexylmethylphosphonium tetrafluoroborate, tri-n-hexylmethylphosphonium hexafluorophosphate, tri-n-hexylmethylphosphonium bis(trifluoromethylsulfonyl)imide, tri-n-propylethylphosphonium tetrafluoroborate, tri-n-propylethylphosphonium hexafluorophosphate, tri-n-propylethylphosphonium bis(trifluoromethylsulfonyl)imide, tri-n-butylethylphosphonium tetrafluoroborate, tri-n-butylethylphosphonium hexafluorophosphate, tri-n-butylethylphosphonium bis(trifluoromethylsulfonyl)imide, tri-n-pentylethylphosphonium tetrafluoroborate, tri-n-pentylethylphosphonium hexafluorophosphate, tri-n-pentylethylphosphonium bis(trifluoromethylsulfonyl)imide, tri-n-hexylethylphosphonium tetrafluoroborate, tri-n-hexylethylphosphonium hexafluorophosphate, tri-n-hexylethylphosphonium bis(trifluoromethylsulfonyl)imide, triethyl-n-propylphosphonium tetrafluoroborate, triethyl-n-butylphosphonium tetrafluoroborate, triethyl-n-propylphosphonium tetrafluoroborate, triethyl-n-hexylphosphonium tetrafluoroborate, triethyl-n-octylphosphonium tetrafluoroborate, triethyl-n-dodecylphosphonium tetrafluoroborate, triethyl-n-propylphosphonium hexafluorophosphate, triethyl-n-butylphosphonium hexafluorophosphate, triethyl-n-propylphosphonium hexafluorophosphate, triethyl-n-hexylphosphonium hexafluorophosphate, triethyl-n-octylphosphonium hexafluorophosphate, triethyl-n-dodecylphosphonium hexafluorophosphate, triethyl-n-propylphosphonium bis(trifluoromethylsulfonyl)imide, triethyl-n-butylphosphonium bis(trifluoromethylsulfonyl)imide, triethyl-n-propylphosphonium bis(trifluoromethylsulfonyl)imide, triethyl-n-hexylphosphonium bis(trifluoromethylsulfonyl)imide, triethyl-n-octylphosphonium bis(trifluoromethylsulfonyl)imide, and triethyl-n-dodecylphosphonium bis(trifluoromethylsulfonyl)imide. Among these, preferred are tri-n-butylmethylphosphonium tetrafluoroborate, tri-n-butylmethylphosphonium hexafluorophosphate, tri-n-butylmethylphosphonium bis(trifluoromethylsulfonyl)imide, triethylmethylphosphonium bis(trifluoromethylsulfonyl)imide, tri-n-butylphosphonium bis(trifluoromethylsulfonyl)imide, and triethyl-n-propylphosphonium bis(trifluoromethylsulfonyl)imide. Tri-n-butylmethylphosphonium bis(trifluoromethylsulfonyl)imide and triethylmethylphosphonium bis(trifluoromethylsulfonyl)imide are particularly preferred because they have high solubility in a nonaqueous solvent and show a high improvement effect of the cycle characteristics and safety of lithium-ion secondary batteries.

As for the preferred physical properties of the tetraalkylphosphonium salt represented by the general formula (1), the tetraalkylphosphonium salt preferably has a melting point of 100° C. or less, more preferably 50° C. or less, in that the tetraalkylphosphonium salt can efficiently impart safety, and high discharge capacity and good cycle characteristics in low temperatures, to the lithium-ion secondary battery using the electrolyte comprising the tetraalkylphosphonium salt.

In addition to the characteristics as described above, the tetraalkylphosphonium salt represented by the general formula (1) of the present invention preferably has a moisture content of 200 ppm or less, more preferably 100 ppm or less, further preferably 30 ppm or less. The lithium-ion secondary battery using the electrolyte solution comprising the electrolyte comprising a tetraalkylphosphonium salt having a low moisture content can improve charge and discharge efficiency and cycle characteristics because it can suppress the side reaction by moisture. Note that the moisture content is determined by a Karl Fischer titration method.

In addition to having the above physical properties, the tetraalkylphosphonium salt preferably has a chlorine content of 100 ppm or less, more preferably 50 ppm or less. The chlorine component includes not only free chlorine but also a species which generates free chlorine by side reaction in a battery. The lithium-ion secondary battery using the electrolyte solution comprising the electrolyte comprising a tetraalkylphosphonium salt having a low chlorine content can improve safety and cycle characteristics.

In order to obtain the tetraalkylphosphonium salt represented by the general formula (1) of the present invention which has the above characteristics and has halogen as the anion component, it is possible to use a commercially available tetraalkylphosphonium halide or a tetraalkylphosphonium halide obtained by reacting trialkylphosphine with an alkyl halide. When the anion component is other than halogen, it is possible to obtain the tetraalkylphosphonium salt by allowing a tetraalkylphosphonium halide to react with a metal salt of the anion component to thereby exchange anions.

For example, when the tetraalkylphosphonium halide is obtained by reacting a trialkylphosphine with an alkyl halide, a trialkylphosphine having only $R_1$ group as the alkyl group (general formula: $(R_1)_3P$) is allowed to react with an alkyl halide having $R_2$ group as the alkyl group (general formula: $R_2X$). This method is preferred because a target substance with few impurities can be obtained.

When halogen of the tetraalkylphosphonium halide is bromine or iodine, the reactivity of the tetraalkylphosphonium halide with the metal salt of the anion component can be enhanced. Therefore, it is preferred to use an alkyl bromide or an alkyl iodide as the alkyl halide. The alkyl halide used for the reaction preferably has a low impurity content as much as possible. Note that, even when the tetraalkylphosphonium halide is a tetraalkylphosphonium chloride, chlorine can also be replaced by another halogen element by using sodium iodide or the like.

For the reaction, the alkyl halide is added in an amount of 0.5 to 2 moles, preferably 0.9 to 1.2 moles to one mole of the trialkylphosphine, and they are allowed to react with each other for 3 hours or more, preferably for 5 to 12 hours at a temperature of from 20 to 150° C., preferably from 30 to 100° C. in an inert solvent containing no chlorine, such as toluene.

The reaction atmosphere is not particularly limited as long as it is an atmosphere containing no oxygen, but a nitrogen atmosphere or an argon atmosphere is preferred. If the trialkylphosphine reacts with the alkyl halide in an atmosphere containing oxygen, a trialkylphosphine oxide in which an oxygen atom is bound to the trialkylphosphine will be produced, which is not preferred because the yield is reduced. The trialkylphosphine oxide is can be appropriately washed with an organic solvent. However, as the total number of carbon atoms in the tetraalkylphosphonium halide increases, the tetraalkylphosphonium halide will also tends to dissolve in the organic solvent, and the removal thereof will become difficult. Therefore, it is preferred to perform reaction under an inert atmosphere for preventing the trialkylphosphine oxide from being produced.

As a metal salt of the anion component used for introducing another anion by the anion exchange of the tetraalkylphosphonium halide, an alkali metal salt such as a Li salt of the above mentioned anion component can be used. Using the alkali metal salt is preferred because the alkali halide produced in the reaction with an alkylphosphine halide can be easily removed by washing with water.

Ultrapure water or deionized water can be used as the water used for water-washing, and it is preferred to appropriately repeatedly perform the water-washing until the impurity content is reduced. The impurities to be removed by water-washing include an unreacted raw material and an alkali halide.

The smaller the residual amount of the alkali halide or the unreacted alkyl halide, the better. In particular, since the performance of a lithium-ion secondary battery may be reduced by a source of chlorine such as an alkali chloride, an alkyl chloride, or a chlorine-based solvent, it is necessary to reduce the residual amount thereof. The content of chlorine in the tetraalkylphosphonium salt of the present invention is preferably 100 ppm or less, more preferably 50 ppm or less because this content can suppress the performance degradation of a lithium-ion secondary battery.

Further, washing with an organic solvent can also be suitably performed in order to remove an unreacted raw material, a by-product, or the like. It is preferred to use a nonpolar solvent containing no chlorine such as pentane, hexane, and heptane as an organic solvent usable for washing, because nonpolar organic compounds in impurities or the like are efficiently removable without dissolving the tetraalkylphosphonium salt.

The tetraalkylphosphonium salt washed with water or an organic solvent is preferably purified to remove moisture and the organic solvent. The tetraalkylphosphonium salt preferably has a moisture content of 200 ppm or less, more preferably 100 ppm or less, further preferably 30 ppm or less, because the performance degradation by moisture can be suppressed when this salt is used as the electrolyte. Purification methods include dehydration with a molecular sieve and removal of a solvent by vacuum drying. Purification by vacuum drying is preferred because mixing of impurities is prevented and moisture and an organic solvent can be removed at once.

Purification by vacuum drying is preferably performed at a drying temperature of from 70 to 120° C., preferably from 80 to 100° C. and a degree of vacuum of from 0.1 to 0.7 kPa, preferably from 0.1 to 0.5 kPa for 2 to 12 hours, preferably for 3 to 10 hours.

The electrolyte comprising the tetraalkylphosphonium salt represented by the general formula (1) of the present invention can be used as an electrolyte of electrochemical elements, such as batteries, capacitors, sensors, display devices, and recording elements. In particular, the electrolyte comprising the tetraalkylphosphonium salt represented by the general formula (1) of the present invention can be suitably used as an electrolyte of the electrolyte solution of lithium-ion secondary batteries.

<Electrolyte Solution for Lithium-Ion Secondary Batteries>

The electrolyte solution for lithium-ion secondary batteries according to the present invention is characterized by comprising the tetraalkylphosphonium salt. The electrolyte solution may further comprise a lithium compound and/or a nonaqueous solvent in combination with the tetraalkylphosphonium salt. Combined use of a tetraalkylphosphonium salt electrolyte and a nonaqueous solvent can suppress the degradation of cycle characteristics by suppressing the side reaction on the surface of a lithium-transition metal composite oxide by the interaction of the tetraalkylphosphonium salt with the lithium-transition metal composite oxide which is a positive electrode active material while maintaining high initial discharge capacity, and allows to further suppress the thermal decomposition of the lithium-transition metal composite oxide in a charged state. In addition, the presence of a nonaqueous solvent is preferred because it can improve the solubility of a lithium compound and reduces the viscosity of an electrolyte solution, so that electrical conductivity is improved and current density at the time of charge and discharge can be increased.

On the other hand, when the tetraalkylphosphonium salt is a liquid, the tetraalkylphosphonium salt is not only an electrolyte but also functions as an electrolyte solution. Therefore, only the tetraalkylphosphonium salt and the lithium compound can constitute an electrolyte solution which does not contain a nonaqueous solvent. In this case, the conductivity tends to be low compared with that of the electrolyte solution containing a nonaqueous solvent. However, it is possible to obtain a lithium-ion secondary battery with high safety because of high flame retardancy and nonvolatility originated from the tetraalkylphosphonium salt.

Examples of the nonaqueous solvent used for the present invention include aprotic organic solvents such as N-methyl-2-pyrrolidinone, propylene carbonate, ethylene carbonate (hereinafter referred to as "EC"), butylene carbonate, dimethyl carbonate, ethyl methyl carbonate (hereinafter referred to as "EMC"), diethyl carbonate, γ-butyrolactone, 1,2-dimethoxyethane, tetrahydroxyfuran, 2-methyltetrahydrofuran, dimethyl sulfoxide, 1,3-dioxolane, formamide, dimethylformamide, dioxolane, acetonitrile, nitromethane, methyl formate, methyl acetate, a phosphate triester, trimethoxymethane, a dioxolane derivative, sulfolane, methyl sulfolane, 3-methyl-2-oxazolidinone, 1,3-dimethyl-2-imidazolidinone, a propylene carbonate derivative, a tetrahydrofuran derivative, diethyl ether, 1,3-propane sultone, methyl propionate, and ethyl propionate, and a solvent obtained by mixing one or more of the above can be used. Among these, it is desirable to use a solvent obtained by mixing ethylene carbonate and methyl ethyl carbonate, because the solvent can provide a stable lithium-ion secondary battery performance.

The mixing ratio of the tetraalkylphosphonium salt represented by the general formula (1) to the nonaqueous solvent is from 2 to 70% by volume, preferably from 5 to 60% by volume, most preferably from 10 to 50% by volume, based on the volume ratio of the tetraalkylphosphonium salt to the nonaqueous solvent. When the volume ratio of the tetraalkylphosphonium salt is lower than 2% by volume, the cycle-characteristics improvement effect of a lithium-ion secondary battery will not sufficiently be obtained. A volume ratio of the tetraalkylphosphonium salt of higher than 70% by volume is not preferred because such a volume ratio increases the viscosity of the electrolyte solution, which disturbs the increase in the current density and a sufficient battery capacity tends to be not obtained.

<Lithium-Ion Secondary Battery>

The lithium compound used for the electrolyte solution for lithium-ion secondary batteries of the present invention can be used with no particular limitation, as long as it is dissolved in the above phosphonium salt or the above phosphonium salt-nonaqueous solvent mixed solvent. For example, use of a lithium compound such as $LiPF_6$, $LiBF_4$, $LiN(SO_2CF_3)_2$, $LiB(C_2O_4)_2$, $LiClO_4$, and $LiSO_3CF_3$ is preferred because such a lithium compound can increase the conductivity of lithium ions. These lithium compounds may be used independently or may be used in combination of two or more. Use of a lithium compound having the same anion as used in the tetraalkylphosphonium salt is not preferred because it reduces the solubility of the lithium compound and disturbs the electrolytic dissociation of the lithium compound to thereby tend to reduce the electrical conductivity. It is preferred to use two or more lithium compounds in combination because it tends to increase the electrical conductivity. The loading of these lithium compounds in the electrolyte solution is from 0.5 to 2.0 mol/l, preferably from 0.8 to 1.5 mol/l based on the solvent.

The electrolyte solution for lithium-ion secondary batteries of the present invention may be prepared by previously dissolving a lithium compound used as the electrolyte into a tetraalkylphosphonium salt or a mixed solvent obtained by mixing the tetraalkylphosphonium salt and a nonaqueous solvent. Alternatively, it may be prepared by previously dissolving a lithium compound into both a liquid tetraalkylphosphonium salt and a nonaqueous solvent, respectively, and then mixing the tetraalkylphosphonium salt electrolyte solution and the nonaqueous electrolyte solution.

The lithium-ion secondary battery according to the present invention is obtained by using the electrolyte solution comprising the above tetraalkylphosphonium salt, and it comprises a positive electrode, a negative electrode, a separator, and the above phosphonium salt-containing electrolyte solution. The positive electrode is formed, for example, by applying a positive electrode mixture onto a positive electrode current collector followed by drying. The positive electrode mixture comprises a positive electrode active material, a conducting agent, a binder, and an optional filler. The negative electrode is formed, for example, by applying a negative electrode mixture onto a negative electrode current collector followed by drying. The negative electrode mixture comprises a negative electrode active material, a binder, and an optional filler.

Since the lithium-ion secondary battery according to the present invention is obtained by using the electrolyte solution comprising the above tetraalkylphosphonium salt, the reduction in the initial discharge capacity is small and the reduction in the cycle characteristics is prevented, and the safety of the lithium-ion secondary battery can be improved because the thermal decomposition of the positive electrode active material is suppressed.

The positive electrode active material used for the lithium-ion secondary battery of the present invention is not particularly limited as long as it is a compound which Li ions can be inserted into and removed from. Examples of the positive electrode active material include $LiCoO_2$, a $LiNi_xMn_yCo_{(1-x-y)}O_2$-based compound, a $LiMn_2O_4$-based compound, a $LiFePO_4$-based compound, and a compound obtained by replacing the metal element of these compounds and a compound obtained by coating the surface thereof with an oxide or the like.

The positive electrode current collector is not particularly limited as long as it is an electron conductor which does not chemically change in the constituted battery. Examples of the positive electrode current collector include stainless steel, nickel, aluminum, titanium, fired carbon, and aluminum and stainless steel surface-treated with carbon, nickel, titanium, or silver. These materials may be surface-treated by oxidation, or the current collector may have asperities on surface thereof formed by surface treatment. The current collector may be in the form of a foil, a film, a sheet, a net, a punched sheet, a lath body, a porous body, a foamed body, fibers, or a formed nonwoven fabric. The thickness of the current collector is preferably, but not limited to, 1 to 500 μm.

The conducting agent is not particularly limited as long as it is an electron-conducting material which does not chemically change in the constituted battery. Examples of the conducting agent include: graphite, such as natural graphite and artificial graphite; carbon black materials, such as carbon black, acetylene black, Ketjen Black, channel black, furnace black, lampblack, and thermal black; conductive fibers, such as carbon fiber and metal fiber; carbon fluoride; metal powders, such as aluminum powder and nickel powder; conductive whiskers of zinc oxide, potassium titanate, or the like; conductive metal oxides, such as titanium oxide; and other conductive materials such as polyphenylene derivatives. Examples of natural graphite include vein graphite, flake graphite, or amorphous graphite. These conducting agents may be used singly or in combination. The conducting agent content in the positive electrode mixture is in the range of 1 to 50% by weight, preferably in the range of 2 to 30% by weight.

Examples of the binder include polysaccharides, thermoplastic resins, and polymers having rubber elasticity such as starch, polyvinylidene fluoride, polyvinyl alcohol, carboxymethyl cellulose, hydroxypropyl cellulose, recycled cellulose, diacetyl cellulose, polyvinylpyrrolidone, tetrafluoroethylene, polyethylene, polypropylene, ethylene-propylene-diene terpolymer (EPDM), sulfonated EPDM, styrene butadiene rubber, fluororubber, tetrafluoroethylene-hexafluoroethylene copolymer, tetrafluoroethylene-hexafluoropropylene copolymer, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, ethylene-acrylic acid copolymer and its sodium ion (Na+)-crosslinked polymer, ethylene-methacrylic acid copolymer and its sodium ion (Na+)-crosslinked polymer, ethylene-methyl acrylate copolymer and its sodium ion (Na+)-crosslinked polymer, ethylene-methyl methacrylate copolymer and its sodium ion (Na+)-crosslinked polymer, and polyethylene oxide. These binders may be used singly or in combination. Note that, when a compound having a functional group which may react with lithium, such as polysaccharides, is used as the binder, the functional group is preferably deactivated by adding, for example, a compound having an isocyanate group. The binder content in the positive electrode mixture is in the range of 1 to 50% by weight, preferably in the range of 5 to 15% by weight.

The filler is intended to suppress the volume expansion and the like of the positive electrode, and it is added to the positive electrode mixture as required. Any fiber can be used as the filler as long as it is a fibrous material which does not chemically change in the constituted battery. Examples of the filler include fibers of olefin polymers such as polypropylene and polyethylene, glass, and carbon. The filler content in the positive electrode mixture is preferably, but not limited to, 0 to 30% by weight.

The negative electrode is formed by applying an anode material onto a negative electrode current collector followed by drying. The negative electrode current collector can be made of any electron conducting material, as long as the material does not chemically change in the constituted battery. Copper and a copper alloy may be used as the negative electrode current collector. These materials may be surface-treated by oxidation, or the collector may have asperities on the surface thereof formed by surface treatment. The negative electrode current collector may be in the form of a foil, a film, a sheet, a net, a punched sheet, a lath body, a porous body, a foamed body, fibers, or a formed nonwoven fabric. The thickness of the negative electrode current collector is preferably, but not limited to, 1 to 500 microns.

Examples of the negative electrode material include, but not limited to, carbonaceous materials, metal composite oxides, lithium metal, lithium alloys, silicon-based alloys, tin-based alloys, metal oxides, conductive polymers, chalcogenides, and Li—Co—Ni-based materials. Examples of the carbonaceous materials include non-graphitizable carbon materials and graphitic carbon materials. Examples of the metal composite oxides include compounds such as $Sn_pM1_{1-p}M2_qO_r$ wherein M1 represents at least one element selected from the group consisting of Mn, Fe, Pb, and Ge; M2 represents at least one element selected from the group consisting of Al, B, P, Si, Group I elements, Group II elements, Group III elements, and halogen elements; and $0<p\leq1$, $1\leq q\leq3$, $1\leq r\leq8$); $Li_xFe_2O_3$ ($0\leq x\leq1$); and $Li_xWO_2$ ($0\leq x\leq1$). Examples of the metal oxides include GeO, $GeO_2$, SnO, $SnO_2$, PbO, $PbO_2$, $Pb_2O_3$, $Pb_3O_4$, $Sb_2O_3$, $Sb_2O_4$, $Sb_2O_5$, $Bi_2O_3$, $Bi_2O_4$, and $Bi_2O_5$. Examples of the conductive polymers include polyacetylene and poly-p-phenylene.

The separator is made of an insulating thin film having a high ion permeability and a specific mechanical strength. From the viewpoint of resistance to organic solvents and hydrophobicity, a sheet or nonwoven fabric made of an olefin polymer such as polypropylene and polyethylene or glass fiber is used as the separator. The pore size of the separator may be in a range generally useful for batteries and is, for example, from 0.01 to 10 µm. The thickness of the separator may be in a range generally used for batteries and is, for example, from 5 to 300 µm.

The electrolyte solution for lithium ion batteries comprising the electrolyte comprising the tetraalkylphosphonium salt represented by the general formula (1) of the present invention has high flame retardancy; the lithium-ion secondary battery using the electrolyte solution has large discharge capacity, high energy density, excellent cycle characteristics, and excellent characteristics in a wide temperature range; and the electrolyte solution can also improve the safety of the battery by suppressing the thermal decomposition of the positive electrode active material in a charged state.

Examples

The present invention will be described in more detail below with reference to Examples. However, it is to be understood that the Examples are illustrative purposes only and the present invention is not limited thereto.
(Synthesis of Onium Salts)

Synthesis Example 1

Synthesis of triethylmethylphosphonium bis(trifluoromethylsulfonyl)imide (Hereinafter Referred to as "TEMP-TFSI")

To 236 g (0.5 mol) of a commercially available 25% solution of triethylphosphine (product name: HISHICOLIN (registered trademark) P-2, manufactured by Nippon Chemical Industrial Co., Ltd.) in toluene, 71 g (0.5 mol) of iodomethane (reagent, manufactured by Tokyo Chemical Industry Co., Ltd.) was added dropwise under a nitrogen atmosphere, and the mixture was reacted at 30 to 40° C. for 5 hours with stirring. After the reaction was completed, 100 ml of hexane was added to the reaction mixture to precipitate crystals. The resulting crystals were filtered and vacuum dried under a degree of vacuum of 0.5 kPa at 80° C. for 3 hours to obtain triethylmethylphosphonium iodide. Thereby, 116 g of triethylmethylphosphonium iodide was obtained (yield 89%). To 78 g (0.3 mol) of the resulting triethylmethylphosphonium iodide, 78 g of pure water was added to form a 50% aqueous solution. Thereto, was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature (25° C.) to complete the reaction. After the completion of the stirring, precipitated crystals were separated by filtration and dissolved in acetone, followed by adding hexane thereto to recrystallize the crystals. The resulting crystals were filtered and vacuum dried under a degree of vacuum of 0.5 kPa at 80° C. for 3 hours. The structure of the resulting product was examined by $^1$H-NMR, $^{13}$C-NMR, $^{19}$F-NMR, and $^{31}$P-NMR. The product was identified as triethylmethylphosphonium bis(trifluoromethylsulfonyl)imide (TEMP-TFSI), and it had a purity of 99%. The resulting TEMP-TFSI was a white solid at room temperature (25° C.), which had a moisture content determined by the Karl Fischer titration method of 98 ppm and a chlorine content determined by ion chromatography of 13 ppm. The amount of the product yielded was 105 g (yield 85%).

Synthesis Example 2

Synthesis of tri-n-butylmethylphosphonium bis(trifluoromethylsulfonyl)imide (Hereinafter Referred to as "TBMP-TFSI")

To 104 g (0.3 mol) of a commercially available tri-n-butylmethylphosphonium iodide (product name: HISHICOLIN (registered trademark) PX-4MI, manufactured by Nippon Chemical Industrial Co., Ltd.), was added 104 g of pure water. To the mixture with stirring, was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature to complete the reaction. After the completion of the stirring, the lower layer side (product) was separated from the mixture in the form of an upper and lower two-layer structure, washed four times with pure water, and then washed four times with n-hexane. After the completion of the washing, the product was vacuum dried under a degree of vacuum of 0.5 kPa at 80° C. for 3 hours. The structure of the resulting product was examined by $^1$H-NMR, $^{13}$C-NMR, $^{19}$F-NMR, and $^{31}$P-NMR. The product was identified as tri-n-butylmethylphosphonium bis(trifluoromethylsulfonyl)imide (TBMP-TFSI), and it had a purity of 99%. The resulting TBMP-TFSI was a colorless transparent liquid at room temperature (25° C.), which had a moisture content determined by the Karl Fischer titration method of 25 ppm and a chlorine content determined by ion chromatography of 10 ppm. The amount of the product yielded was 128 g (yield 84%). The product had an electrical conductivity at 25° C. of 0.42 mS/cm.

Synthesis Example 3

Synthesis of tri-n-hexylmethylphosphonium bis(trifluoromethylsulfonyl)imide (Hereinafter Referred to as "THMP-TFSI")

To 143 g (0.5 mol) of a commercially available tri-n-hexylphosphine (reagent, manufactured by Tokyo Chemical Industry Co., Ltd.), 71 g (0.5 mol) of iodomethane (reagent, manufactured by Tokyo Chemical Industry Co., Ltd.) was added dropwise under a nitrogen atmosphere, and the mixture was reacted at 30 to 40° C. for 5 hours. After the reaction was completed, 100 ml of hexane was added to the reaction mixture to separate layers. The resulting liquid was then washed three times with hexane and vacuum dried under a degree of vacuum of 0.5 kPa at 80° C. for 3 hours to obtain 182 g (yield 85%) of tri-n-hexylmethylphosphonium iodide. To 129 g (0.3 mol) of the resulting tri-n-hexylmethylphosphonium iodide, was added 129 g of pure water. To the mixture with stirring, was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature to complete the reaction. After the completion of the stirring, the lower layer side (product) was separated from the mixture in the form of an upper and lower two-layer structure, washed four times with pure water, and then washed four times with n-hexane. After the completion of the washing, the product was vacuum dried under a degree of vacuum of 0.5 kPa at 80° C. for 3 hours. The structure of the resulting product was examined by $^1$H-NMR, $^{13}$C-NMR, $^{19}$F-NMR, and $^{31}$P-NMR. The product was identified as tri-n-hexylmethylphosphonium bis(trifluoromethylsulfonyl)imide (THMP-TFSI), and it had a purity of 99%. The resulting THMP-TFSI was a colorless transparent liquid at room temperature (25° C.), which had a moisture content determined by the Karl Fischer titration method of 104 ppm and a chlorine content determined by ion chromatography of 8 ppm. The amount of the product yielded was 140 g (yield 80%). The product had an electrical conductivity at 25° C. of 0.20 mS/cm.

Synthesis Example 4

Synthesis of triethyl-n-pentylphosphonium bis(trifluoromethylsulfonyl)imide (Hereinafter Referred to as "TEPP-TFSI")

To 236 g (0.5 mol) of a commercially available 25% solution of triethylphosphine (product name: HISHICOLIN (registered trademark) P-2, manufactured by Nippon Chemical Industrial Co., Ltd.) in toluene, 77 g (0.5 mol) of 1-bromopentane (reagent, manufactured by Tokyo Chemical Industry Co., Ltd.) was added dropwise under a nitrogen atmosphere, and the mixture was reacted at 70 to 80° C. for 5 hours. After the reaction was completed, 100 ml of hexane was added to the reaction mixture to precipitate crystals. The resulting crystals were filtered and vacuum dried under a degree of vacuum of 0.5 kPa at 80° C. for 3 hours to obtain 124 g (yield 92%) of triethyl-n-pentylphosphonium bromide. To 54 g (0.2 mol) of the resulting triethyl-n-pentylphosphonium bromide, pure water was added to form a 50% aqueous solution. Thereto, was added 58 g (0.2 mol) of lithium bis(trifluoromethylsulfonyl)imide (reagent, manufactured by Kanto Chemical Co., Inc.) to allow them to react with each other, followed by stirring for 2 hours at room temperature for aging. After the completion of aging with stirring, the lower layer side (product) was separated from the mixture in the form of an upper and lower two-layer structure, washed four times with pure water, and then washed four times with n-hexane. After the completion of the washing, the product was vacuum dried under a degree of vacuum of 0.5 kPa at 80° C. for 3 hours. The structure of the product was examined by $^1$H-NMR, $^{13}$C-NMR, $^{19}$F-NMR, and $^{31}$P-NMR. The product was identified as triethyl-n-pentylphosphonium bis(trifluoromethylsulfonyl)imide (TEPP-TFSI), and it had a purity of 99%. The resulting TEPP-TFSI was a colorless transparent liquid at room temperature (25° C.), which had a moisture content determined by the Karl Fischer titration method of 28 ppm and a chlorine content determined by ion chromatography of 7 ppm. The amount of the product yielded was 82 g (yield 85%). The product had an electrical conductivity at 25° C. of 1.73 mS/cm.

Synthesis Example 5

Synthesis of triethyl-n-dodecylphosphonium bis(trifluoromethylsulfonyl)imide (Hereinafter Referred to as "TEDP-TFSI")

To 236 g (0.5 mol) of a commercially available 25% solution of triethylphosphine (product name: HISHICOLIN (registered trademark) P-2, manufactured by Nippon Chemical Industrial Co., Ltd.) in toluene, 127 g (0.5 mol) of 1-bromododecane (reagent, manufactured by Tokyo Chemical Industry Co., Ltd.) was added dropwise under a nitrogen atmosphere, and the mixture was reacted at 70 to 80° C. for 5 hours. After the reaction was completed, 100 ml of hexane was added to the reaction mixture to precipitate crystals. The resulting crystals were filtered and vacuum dried under a degree of vacuum of 0.5 kPa at 80° C. for 3 hours to obtain 166 g (yield 90%) of triethyl-n-dodecylphosphonium bromide. To 110 g (0.3 mol) of the resulting triethyl-n-dodecylphosphonium bromide, pure water was added to form a 50% aqueous solution. Thereto, was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature for aging. After the completion of aging with stirring, the lower layer side (product) was separated from the mixture in the form of an upper and lower two-layer structure, washed four times with pure water, and then washed four times with n-hexane. After the completion of the washing, the product was vacuum dried under a degree of vacuum of 0.5 kPa at 80° C. for 3 hours. The structure of the product was examined by $^1$H-NMR, $^{13}$C-NMR, $^{19}$F-NMR, and $^{31}$P-NMR. The product was identified as triethyl-n-dodecylphosphonium bis(trifluoromethylsulfonyl)imide (TEDP-TFSI), and it had a purity of 99%. The resulting TEDP-TFSI was a colorless transparent liquid at room temperature (25° C.), which had a moisture content determined by the Karl Fischer titration method of 73 ppm and a chlorine content determined by ion chromatography of 8 ppm. The amount of the product yielded was 150 g (yield 88%). The product had an electrical conductivity at 25° C. of 0.47 mS/cm.

Synthesis Example 6

Synthesis of tri-n-butyloctylphosphonium bis(trifluoromethylsulfonyl)imide (Hereinafter Referred to as "TBOP-TFSI")

To 119 g (0.3 mol) of a commercially available tri-n-butyloctylphosphonium bromide (product name: HISHICOLIN (registered trademark) PX-48B, manufactured by Nippon Chemical Industrial Co., Ltd.), pure water was added to form a 50% aqueous solution. Thereto, was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature for aging. After the completion of aging with stirring, precipitated crystals were separated by filtration, dissolved in acetone, and recrystallized from n-hexane, followed by vacuum-drying the resulting crystals. The structure of the product was examined by $^1$H-NMR, $^{13}$C-NMR, $^{19}$F-NMR, and $^{31}$P-NMR. The product was identified as tri-n-butyloctylphosphonium bis(trifluoromethylsulfonyl)imide (TBOP-TFSI), and it had a purity of 99%. The resulting TBOP-TFSI was a colorless transparent liquid at room temperature (25° C.), which had a moisture content determined by the Karl Fischer titration method of 63 ppm and a chlorine content determined by ion chromatography of 11 ppm. The amount of the product yielded was 164 g (yield 92%). The product had an electrical conductivity at 25° C. of 0.07 mS/cm.

Synthesis Example 7

Synthesis of tri-n-butylmethylphosphonium hexafluorophosphate (Hereinafter Referred to as "TBMP-PF6")

To 152 g (0.3 mol) of a 50% aqueous solution of a commercially available tri-n-butylmethylphosphonium chloride (product name: PX-4MC, manufactured by Nippon Chemical Industrial Co., Ltd.), was added 56 g (0.3 mol) of lithium hexafluorophosphate (reagent, manufactured by Kanto Chemical Co., Inc.) to allow them to react with each other, followed by stirring for 2 hours at room temperature to complete the reaction. After the completion of the stirring, precipitated crystals were separated by filtration and dissolved in acetone, followed by adding hexane thereto to recrystallize the crystals. The resulting crystals were filtered and vacuum dried under a degree of vacuum of 0.5 kPa at 80° C. for 3 hours. The structure of the resulting product was examined by $^1$H-NMR, $^{13}$C-NMR, $^{19}$F-NMR, and $^{31}$P-NMR. The product was identified as tri-n-butylmethylphosphonium hexafluorophosphate (TBMP-PF6), and it had a purity of 99%. The resulting TBMP-PF6 was a white solid at room temperature (25° C.), which had a moisture content determined by the Karl Fischer titration method of 110 ppm and a chlorine content determined by ion chromatography of 10 ppm. The amount of the product yielded was 87 g (yield 83%).

Synthesis Example 8

Synthesis of tri-n-octylmethylphosphonium bis(trifluoromethylsulfonyl)imide (Hereinafter Referred to as "TOMP-TFSI)

To 185 g (0.5 mol) of a commercially available tri-n-octylphosphine (product name: HISHICOLIN (registered trademark) P-8, manufactured by Nippon Chemical Industrial Co., Ltd.), 71 g (0.5 mol) of iodomethane (reagent, manufactured by Tokyo Chemical Industry Co., Ltd.) was added dropwise under a nitrogen atmosphere, and the mixture was reacted at 30 to 40° C. for 5 hours. After the reaction was completed, 100 ml of hexane was added to the reaction mixture to separate layers. The resulting liquid was then washed three times with hexane and vacuum dried under a degree of vacuum of 0.5 kPa at 80° C. for 3 hours to obtain 205 g (yield 80%) of tri-n-octylmethylphosphonium iodide. To 41 g (0.08 mol) of the resulting tri-n-octylmethylphosphonium iodide, was added 41 g of pure water. To the mixture with stirring, was added 23 g (0.08 mol) of lithium bis(trifluoromethylsulfonyl)imide (reagent, manufactured by Kanto Chemical Co., Inc.) to allow them to react with each other, followed by stirring for 2 hours at room temperature for aging. After the completion of aging with stirring, the lower layer (product) was separated from the mixture and washed four times with pure water. After the completion of the washing, the product was vacuum dried under a degree of vacuum of 0.5 kPa at 80° C. for 3 hours. The structure of the resulting product was examined by $^1$H-NMR, $^{13}$C-NMR, $^{19}$F-NMR, and $^{31}$P-NMR. The product was identified as tri-n-octylmethylphosphonium bis(trifluoromethylsulfonyl)imide (TOMP-TFSI), and it had a purity of 99%. The resulting TOMP-TFSI was a colorless transparent liquid at room temperature (25° C.), which had a moisture content determined by the Karl Fischer titration method of 65 ppm and a chlorine content determined by ion chromatography of 10 ppm. The amount of the product yielded was 49 g (yield 92%). The product had an electrical conductivity at 25° C. of 0.09 mS/cm.

Synthesis Example 9

Synthesis of tetra-n-butylphosphonium bis(trifluoromethylsulfonyl)imide (Hereinafter Referred to as "TBP-TFSI")

To 111 g (0.3 mol) of a 80% aqueous solution of a commercially available tetra-n-butylphosphonium chloride (product name: HISHICOLIN (registered trademark) PX-4C, manufactured by Nippon Chemical Industrial Co., Ltd.), was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature for aging. After the completion of aging with stirring, precipitated crystals were separated by filtration, dissolved in acetone, and recrystallized from n-hexane, followed by vacuum-drying the resulting crystals. The structure of the resulting product was examined by $^1$H-NMR, $^{13}$C-NMR, $^{19}$F-NMR, and $^{31}$P-NMR. The product was identified as tetra-n-butylphosphonium bis(trifluoromethylsulfonyl)imide (TBP-TFSI), and it had a purity of 99%. The resulting TBP-TFSI was a white solid at room temperature (25° C.), which had a moisture content determined by the Karl Fischer titration method of 121 ppm and a chlorine content determined by ion chromatography of 12 ppm. The amount of the product yielded was 141 g (yield 87%).

Synthesis Example 10

Synthesis of tri-n-butylmethylammonium bis(trifluoromethylsulfonyl)imide (Hereinafter Referred to as "TBMA-TFSI")

To 134 g (0.3 mol) of a 75% aqueous solution of a commercially available tri-n-butylmethylammonium chloride (reagent, manufactured by Sigma-Aldrich Corporation), was added 86 g (0.3 mol) of lithium bis(trifluoromethylsulfonyl)imide (reagent, manufactured by Kanto Chemical Co., Inc.) to allow them to react with each other, followed by stirring for 2 hours at room temperature for aging. After the completion of aging with stirring, the lower layer (product) was separated from the mixture and washed four times with pure water. After the completion of the washing, the product was vacuum dried under a degree of vacuum of 0.5 kPa at 80° C. for 3 hours. The structure of the resulting product was examined by $^1$H-NMR, $^{13}$C-NMR, $^{19}$F-NMR, and $^{31}$P-NMR. The product was identified as tri-n-butylmethylammonium bis(trifluoromethylsulfonyl)imide (TBMA-TFSI), and it had a purity of 99%. The resulting TBMA-TFSI was a colorless transparent liquid at room temperature (25° C.), which had a moisture content determined by the Karl Fischer titration method of 89 ppm and a chlorine content determined by ion chromatography of 30 ppm. The amount of the product yielded was 128 g (yield 89%). The product had an electrical conductivity at 25° C. of 0.31 mS/cm.

Preparation of Electrolyte Solution

Example 1

A phosphonium salt-nonaqueous electrolyte solution mixture was prepared by mixing TEMP-TFSI prepared in Synthesis Example 1 with a nonaqueous electrolyte solution so that the volume ratio of TEMP-TFSI to the nonaqueous electrolyte solution was 1:1. As the nonaqueous electrolyte solution, was used a nonaqueous electrolyte solution (having an electrical conductivity at 25° C. of 9.13 mS/cm, trade name: Purelyte, manufactured by Ube Industries, Ltd.) obtained by dissolving LiPF$_6$ in a solvent consisting of ethylene carbonate and ethyl methyl carbonate in a volume ratio of 1:2 so that LiPF$_6$ was contained in an amount of 1.0 mol/L. An electrolyte solution sample B1 was prepared by further dissolving lithium bis(trifluoromethylsulfonyl)imide in the above phosphonium salt-nonaqueous electrolyte solution mixture so that lithium bis(trifluoromethylsulfonyl)imide was contained in an amount of 0.4 mol/L.

Example 2

An electrolyte solution sample A2 was prepared by dissolving lithium bis(trifluoromethylsulfonyl)imide in TBMP-TFSI prepared in Synthesis Example 2 so that lithium bis(trifluoromethylsulfonyl)imide was contained in an amount of 0.8 mol/L.

An electrolyte solution sample B2 was prepared by mixing the electrolyte solution A2 with a nonaqueous electrolyte solution so that the volume ratio of the electrolyte solution A2 to the nonaqueous electrolyte solution was 1:1. As the nonaqueous electrolyte solution, was used an electrolyte solution (having an electrical conductivity at 25° C. of 9.13 mS/cm, trade name: Purelyte, manufactured by Ube Industries, Ltd.) obtained by dissolving LiPF$_6$ in a solvent consisting of ethylene carbonate and ethyl methyl carbonate in a volume ratio of 1:2 so that LiPF$_6$ was contained in an amount of 1.0 mol/L.

Example 3

An electrolyte solution sample A3 and an electrolyte solution sample B3 were prepared in substantially the same manner as in Example 2 except that THMP-TFSI prepared in Synthesis Example 3 was used as a phosphonium salt.

Example 4

An electrolyte solution sample A4 and an electrolyte solution sample B4 were prepared in substantially the same manner as in Example 2 except that TEPP-TFSI prepared in Synthesis Example 4 was used instead of TBMP-TFSI prepared in Synthesis Example 2.

Example 5

An electrolyte solution sample A5 and an electrolyte solution sample B5 were prepared in substantially the same manner as in Example 2 except that TEDP-TFSI prepared in Synthesis Example 5 was used instead of TBMP-TFSI prepared in Synthesis Example 2.

Example 6

An electrolyte solution sample A6 and an electrolyte solution sample B6 were prepared in substantially the same manner as in Example 2 except that TBOP-TFSI prepared in Synthesis Example 6 was used instead of TBMP-TFSI prepared in Synthesis Example 2.

Example 7

An electrolyte solution sample B7 was prepared in substantially the same manner as in Example 1 except that TBMP-PF6 prepared in Synthesis Example 7 was used instead of TEMP-TFSI prepared in Synthesis Example 1.

Comparative Example 1

An electrolyte solution sample A8 and an electrolyte solution sample B8 were prepared in substantially the same manner as in Example 2 except that TOMP-TFSI prepared in Synthesis Example 8 was used instead of TBMP-TFSI prepared in Synthesis Example 2.

Comparative Example 2

An electrolyte solution sample B9 was prepared in substantially the same manner as in Example 1 except that TBP-TFSI prepared in Synthesis Example 9 was used instead of TEMP-TFSI prepared in Synthesis Example 1.

Comparative Example 3

An electrolyte solution sample A10 and an electrolyte solution sample B10 were prepared in substantially the same manner as in Example 2 except that TBMA-TFSI prepared in Synthesis Example 10 was used instead of TBMP-TFSI prepared in Synthesis Example 2.

Comparative Example 4

An electrolyte solution sample A11 and an electrolyte solution sample B11 were prepared in substantially the same manner as in Example 2 except that a commercially available tri-n-hexyl-n-tetradecylphosphonium bis(trifluoromethylsulfonyl)imide (hereinafter referred to as "THTdP-TFSI") was used instead of TBMP-TFSI prepared by Synthesis Example 2.

TABLE 1

| Electrolyte solution sample | Type of onium salt | Type of lithium compound | | Type of nonaqueous solvent |
|---|---|---|---|---|
| A2 | TBMP-TFSI | LiTFSI | — | — |
| A3 | THMP-TFSI | LiTFSI | — | — |
| A4 | TEPP-TFSI | LiTFSI | — | — |
| A5 | TEDP-TFSI | LiTFSI | — | — |
| A6 | TBOP-TFSI | LiTFSI | — | — |
| A8 | TOMP-TFSI | LiTFSI | — | — |
| A10 | TBMA-TFSI | LiTFSI | — | — |
| A11 | THTdP-TFSI | LiTFSI | — | — |
| B1 | TEMP-TFSI | LiTFSI | LiPF$_6$ | EC•EMC |
| B2 | TBMP-TFSI | LiTFSI | LiPF$_6$ | EC•EMC |
| B3 | THMP-TFSI | LiTFSI | LiPF$_6$ | EC•EMC |
| B4 | TEPP-TFSI | LiTFSI | LiPF$_6$ | EC•EMC |
| B5 | TEDP-TFSI | LiTFSI | LiPF$_6$ | EC•EMC |
| B6 | TBOP-TFSI | LiTFSI | LiPF$_6$ | EC•EMC |
| B7 | TBMP-PF6 | LiTFSI | LiPF$_6$ | EC•EMC |
| B8 | TOMP-TFSI | LiTFSI | LiPF$_6$ | EC•EMC |
| B9 | TBP-TFSI | LiTFSI | LiPF$_6$ | EC•EMC |
| B10 | TBMA-TFSI | LiTFSI | LiPF$_6$ | EC•EMC |
| B11 | THTdP-TFSI | LiTFSI | LiPF$_6$ | EC•EMC |

Note:
In Table 1, LiTFSI represents lithium bis(trifluoromethylsulfonyl)imide; EC represents ethylene carbonate; and EMC represents ethyl methyl carbonate.

(Electrical Conductivity Measurement)

Electrolyte solutions A2 to A6, A8, A10 to A11, and B1 to B11 were measured for electrical conductivity at 25° C. using an AC 2-pole conductivity meter (CM-25R, manufactured by DKK-TOA Corporation). Results of the measurement are shown in Table 2.

TABLE 2

| | Electrolyte solution | Electrical conductivity (mS/cm) | Electrolyte solution | Electrical Conductivity (mS/cm) |
|---|---|---|---|---|
| Example 1 | — | — | B1 | 3.49 |
| Example 2 | A2 | 0.42 | B2 | 3.58 |
| Example 3 | A3 | 0.20 | B3 | 2.78 |
| Example 4 | A4 | 1.73 | B4 | 5.06 |
| Example 5 | A5 | 0.47 | B5 | 3.6 |
| Example 6 | A6 | 0.27 | B6 | 2.85 |
| Example 7 | — | — | B7 | 5.74 |
| Comparative Example 1 | A8 | 0.09 | B8 | 2.08 |
| Comparative Example 2 | — | — | B9 | 3.49 |
| Comparative Example 3 | A10 | 0.31 | B10 | 3.48 |
| Comparative Example 4 | A11 | 0.10 | B11 | 2.00 |

Test of Battery Performance

Examples 8 and 9, Comparative Examples 5 and 6

(1) Manufacture of Lithium-Ion Secondary Batteries

A commercially available lithium cobaltate (Cellseed (registered trademark) C-5, manufactured by Nippon Chemical Industrial Co., Ltd.) in an amount of 95% by weight, carbon powder (SUPER P, manufactured by TIMCAL Graphite & Carbon) in an amount of 2.5% by weight, and polyvinylidene fluoride in an amount of 2.5% by weight were mixed to prepare a positive electrode mixture, which was then dispersed in N-methyl 2-pyrrolidinone to prepare a kneaded paste. The kneaded paste was applied to an aluminum foil and then dried. The resulting aluminum foil was pressed and punched into a circular disk having a diameter of 15 mm to obtain a positive plate.

A lithium-ion secondary battery was manufactured by using members including the above positive plate (positive electrode material weight: 7 mg), an electrolyte solution, a separator, a lithium metal negative electrode, a positive electrode, a current collector, a fitting, and an external terminal. The resulting lithium-ion secondary battery was used for battery performance evaluation and thermal stability test. A lithium-ion secondary battery was manufactured by using, as an electrolyte solution, B2, B4, B11, or a nonaqueous electrolyte solution B12 (trade name: Purelyte, manufactured by Ube Industries, Ltd.) obtained by dissolving $LiPF_6$ in a solvent consisting of ethylene carbonate and ethyl methyl carbonate in a volume ratio of 1:2 so that $LiPF_6$ was contained in an amount of 1.0 mol/L.

(2) Evaluation of Battery Performance

The manufactured lithium-ion secondary batteries were operated at room temperature (25° C.), and the following battery performance was evaluated.

Measurement of initial discharge capacity (mAH/g), initial energy density (mWh/g), capacity maintenance rate after 20 cycles, and energy maintenance rate after 20 cycles Initial discharge capacity and initial energy density were measured after one cycle of charge and discharge in which the positive electrode was charged at room temperature to 4.3 V at 1.0 mA/cm2 and then discharged to 2.7 V at 0.5 mA/cm2. The results are shown in Table 3.

Subsequently, the capacity maintenance rate was calculated by the following formula by conducting 20 cycles of charge and discharge in the above measurement of discharge capacity. The results are shown in Table 3.

Capacity maintenance rate (%)={discharge capacity at 20th cycle/discharge capacity at first cycle}×100

Further, the energy maintenance rate was calculated by the following formula from the 20 cycles of charge and discharge test. The results are shown in Table 3.

Energy maintenance rate (%)={energy density at 20th cycle/energy density at first cycle}×100

TABLE 3

| | Electrolyte solution used | Initial discharge capacity (mAh/g) | Initial enegy density (mWh/g) | Capacity maintenance rate after 20 cycles Energy maintenance rate after 20 cycles (%) | Energy Maintenance rate after 20 cycles (%) |
|---|---|---|---|---|---|
| Example 8 | B2 | 160.2 | 629.5 | 97.6 | 96.9 |
| Example 9 | B4 | 157.1 | 624 | 95.6 | 91.7 |
| Comparative Example 5 | B11 | 135.3 | 519.5 | 95.2 | 96.1 |
| Comparative Example 6 | B12 | 156.5 | 619.7 | 91.6 | 83.6 |

From the results of the tests of battery performance, it is understood that, when the electrolyte solution comprising the tetraalkylphosphonium salt according to the present invention is used as an electrolyte, the resulting battery has a higher initial discharge capacity, a higher initial energy density, a better capacity maintenance rate after 20 cycles, and a better energy maintenance rate after 20 cycles than the battery in Comparative Example 6 in which the phosphonium salt is not used. On the other hand, it is understood that, in Comparative Example 5, the capacity maintenance rate after 20 cycles is improved, but the initial discharge capacity is greatly reduced.

Differential Scanning Calorimetry (DSC) of a Positive Electrode Active Material and an Electrolyte Solution Examples 10 and 11, and Comparative Examples 7 and 8

In substantially the same manner as in Examples 8 and 9 and Comparative Examples 5 and 6, the respective lithium secondary batteries manufactured were subjected to the following test at room temperature (25° C.): One cycle of charge and discharge in which the positive electrode was charged to 4.4 V at 1.0 mA/cm2 and then discharged to 2.7 V at 0.5 mA/cm2 was followed by further charging to 4.4 V at 1.0 mA/cm2, and then the resulting battery was decomposed and the positive electrode in a charged state was taken out. The resulting positive electrode was scraped off, and 5 mg of the electrode and 5 μL of the same electrolyte solution as the electrolyte solution as used for manufacturing the battery were sealed into a sealed DSC measurement cell made of stainless steel. This measuring cell was subjected to DSC measurement in a temperature range of 150° C. to 300° C. at a heating rate of 2° C./min with a DSC measurement device (DSC6200, manufactured by Seiko Instrumental, Inc.). The temperatures of main exothermic peaks are shown in Table 4, and the DSC measurement results are shown in FIGS. 1 to 4.

TABLE 4

| | Electrolyte solution used | DSC exothermic temperature |
|---|---|---|
| Example 10 | B2 | 244.7° C. |
| Example 11 | B4 | 244.7° C. |
| Comparative Example 7 | B11 | 239.0° C. |
| Comparative Example 8 | B12 | 200.5° C. |

The results of the DSC measurement suggests that the electrolyte solution comprising the tetraalkylphosphonium salt according to the present invention suppresses decomposition of a positive electrode active material and improves the safety of a battery because the reaction of the positive electrode active material with a nonaqueous solvent is prevented by the action of the tetraalkylphosphonium salt on the surface of the active material. Further, it is understood that the decomposition of a positive electrode active material is suppressed and the reaction of the positive electrode active material with a nonaqueous solvent is also effectively suppressed to improve the safety of a battery, because, in the electrolyte solution comprising the phosphonium salt electrolyte according to the present invention, not only the DSC exothermic temperature shifts to the high temperature side, but also the calorific value is suppressed at a low value.

INDUSTRIAL APPLICABILITY

The present invention can impart high flame retardancy to a nonaqueous electrolyte solution and can also improve the safety of a battery by suppressing the thermal decomposition of a positive electrode active material itself. Further, the present invention can suppress the reduction in the initial discharge capacity of a lithium-ion secondary battery and can also suppress the reduction in the capacity and the reduction in the average discharge voltage accompanying the charge and discharge cycle.

Figure 1:
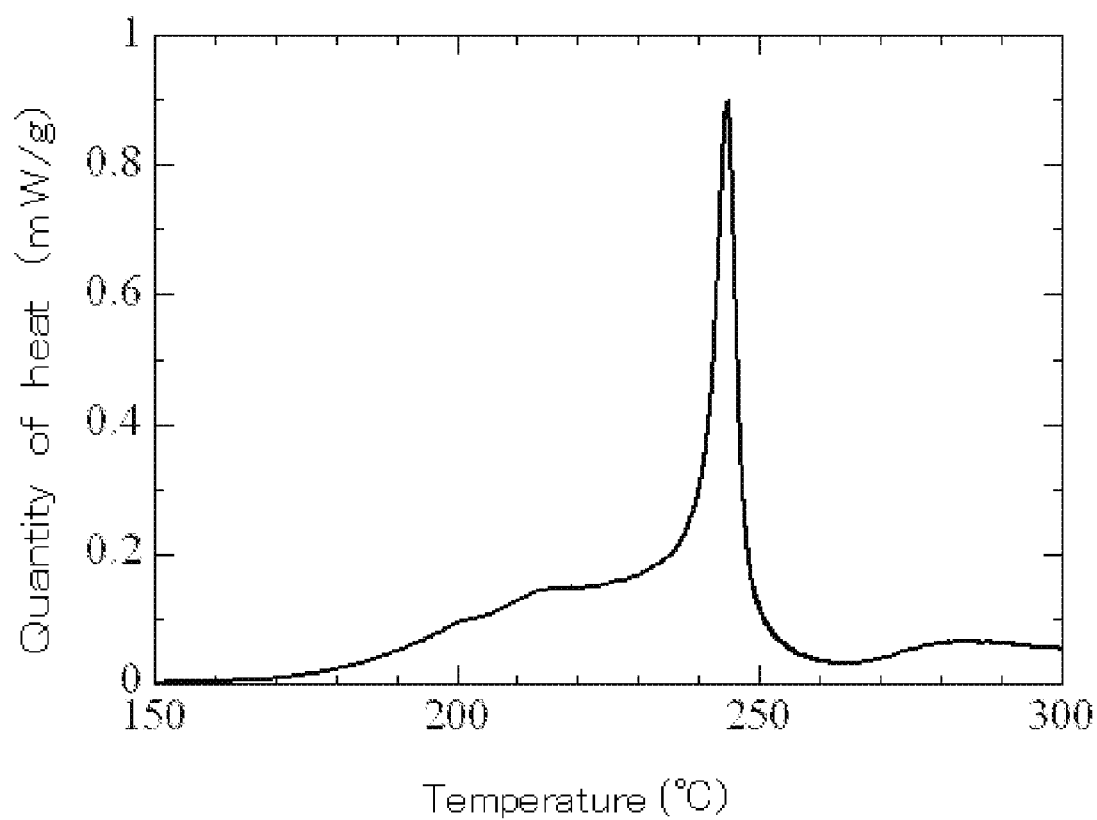
FIG. 1 shows the DSC measurement result measured in Example 10.
Figure 2:
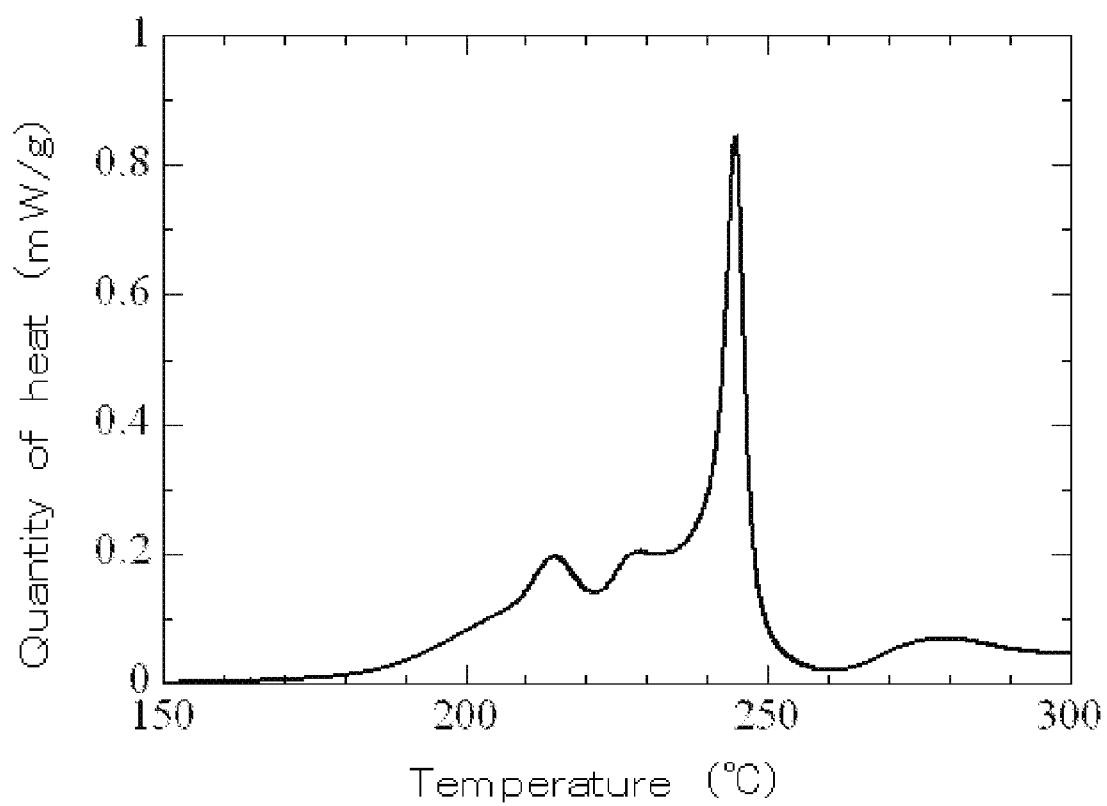
FIG. 2 shows the DSC measurement result measured in Example 11.
Figure 3:
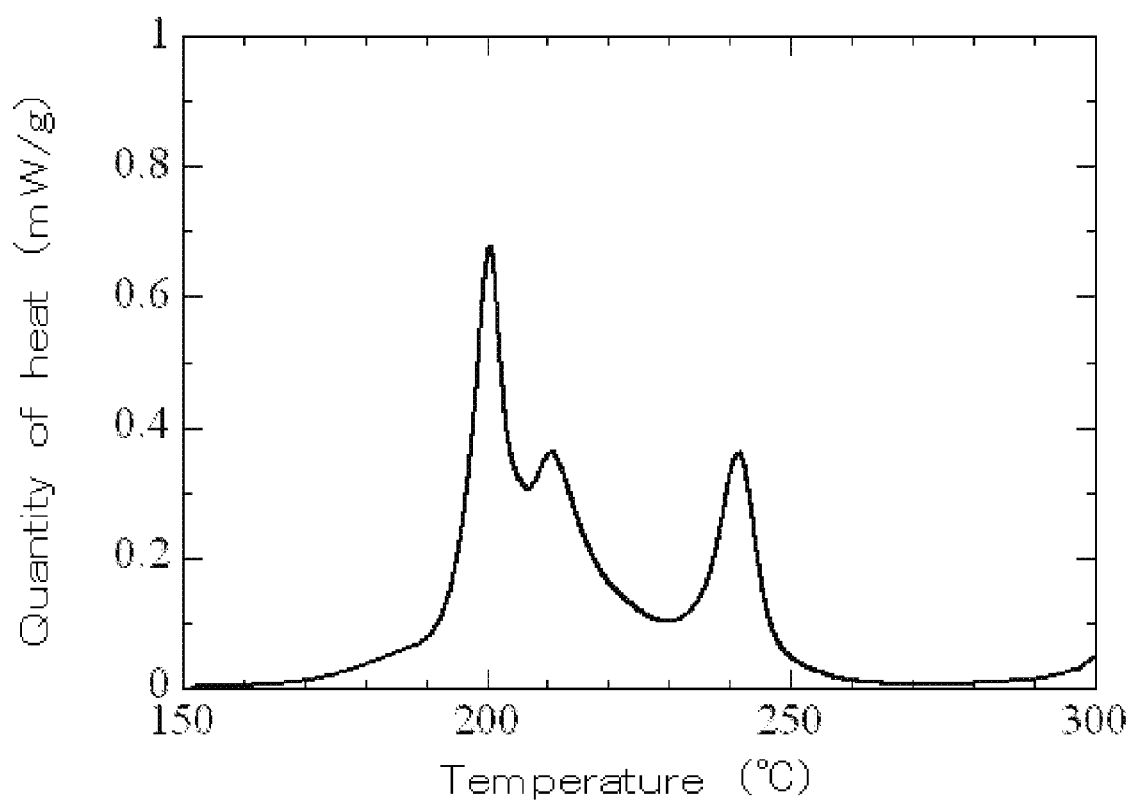
FIG. 3 shows the DSC measurement result measured in Comparative Example 7.
Figure 4:
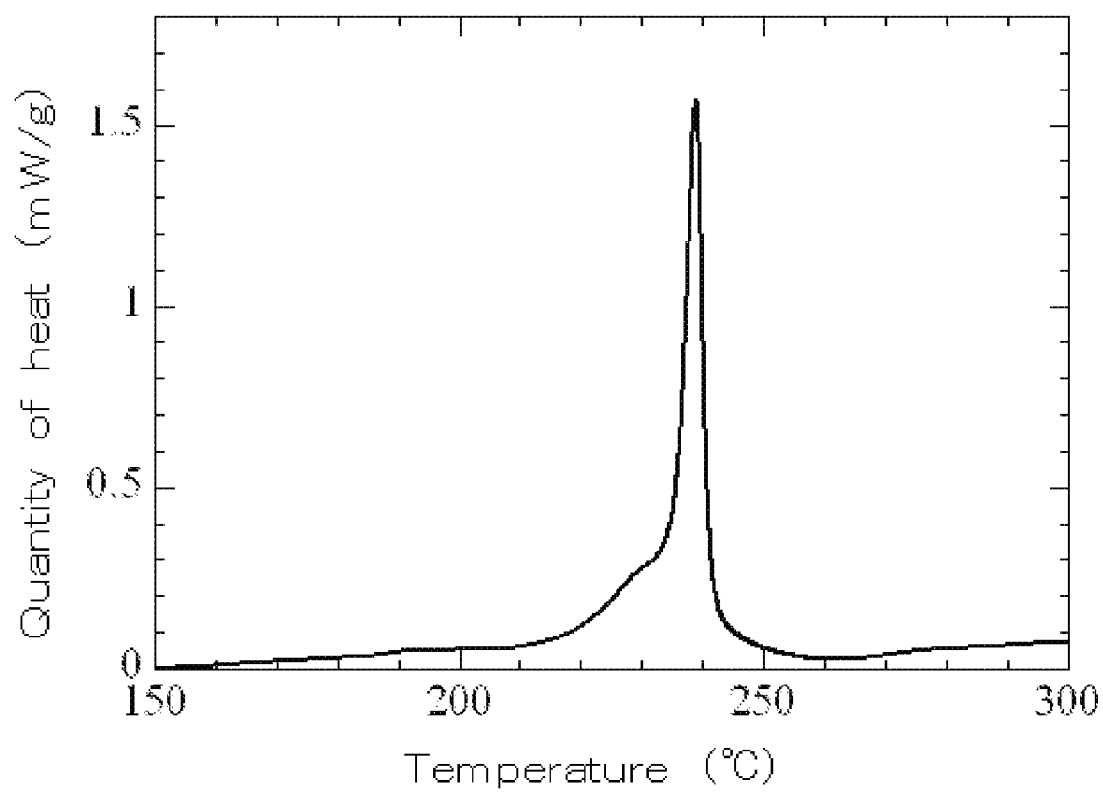
FIG. 4 shows the DSC measurement result measured in Comparative Example 8.

The invention claimed is:

1. An electrolyte solution for lithium-ion secondary batteries characterized by comprising:

a tetraalkylphosphonium salt represented by general formula (1):

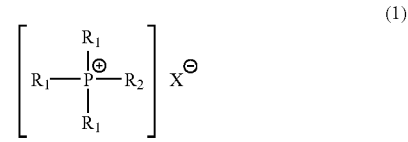

wherein $R_1$ represents a linear, branched or alicyclic alkyl group having 2 to 6 carbon atoms and $R_2$ represents a linear, branched or alicyclic alkyl group having 1 to 14 carbon atoms, provided that $R_1$ and $R_2$ are different from each other and the total number of carbon atoms in the phosphonium cation is 20 or less; and X represents an anion selected from the group consisting of $SO_3CF_3$, $B(C_2O_4)_2$, and $N(SO_2CF_3)_2$; and a lithium compound, wherein the lithium compound is one or more selected from the group consisting of $LiPF_6$, $LiBF_4$, $LiSO_3CF_3$, $LiB(C_2O_4)_2$, and $LiN(SO_2CF_3)_2$.

2. The electrolyte solution for lithium-ion secondary batteries according to claim 1, characterized in that, in the general formula (1), $R_1$ has a larger number of carbon atoms than $R_2$.

3. The electrolyte solution for lithium-ion secondary batteries according to claim 1, characterized in that, in the general formula (1), $R_2$ has a larger number of carbon atoms than $R_1$.

4. The electrolyte solution for lithium-ion secondary batteries according to claim 1, characterized in that, in the general formula (1), $R_2$ is a methyl group.

5. The electrolyte solution for lithium-ion secondary batteries according to claim 1, characterized in that, in the general formula (1), $R_1$ is an ethyl group.

6. The electrolyte solution for lithium-ion secondary batteries according to claim 1, characterized in that the tetraalkylphosphonium salt represented by the general formula (1) is tri-n-butylmethylphosphonium bis(trifluoromethylsulfonyl)imide.

7. The electrolyte solution for lithium-ion secondary batteries according to claim 1, characterized in that the tetraalkylphosphonium salt represented by the general formula (1) is triethylmethylphosphonium bis(trifluoromethylsulfonyl)imide.

8. The electrolyte solution for lithium-ion secondary batteries according to claim 1, characterized by further comprising a nonaqueous solvent.

9. The electrolyte solution for lithium-ion secondary batteries according to claim 1, characterized by comprising the tetraalkylphosphonium salt represented by the general formula (1) in an amount of 2% by volume or more and 70% by volume or less.

10. The electrolyte solution for lithium-ion secondary batteries according to claim 1, characterized in that the lithium compound is two or more selected from the group consisting of $LiPF_6$, $LiBF_4$, $LiSO_3CF_3$, $LiB(C_2O_4)_2$, and $LiN(SO_2CF_3)_2$.

11. A lithium-ion secondary battery, characterized by using the electrolyte solution for lithium-ion secondary batteries according to claim 1.

* * * * *